US007969285B2

(12) United States Patent
Bauchot et al.

(10) Patent No.: US 7,969,285 B2
(45) Date of Patent: Jun. 28, 2011

(54) MANAGEMENT OF BADGE ACCESS TO DIFFERENT ZONES

(75) Inventors: Frederic Bauchot, Saint-Jeannet (FR); Maurice Berdah, Saint-Brice-Sous-Foret (FR); Gerard Marmigere, Drap (FR)

(73) Assignee: International Business Machines Corporation, Armonk, NY (US)

(*) Notice: Subject to any disclaimer, the term of this patent is extended or adjusted under 35 U.S.C. 154(b) by 1180 days.

(21) Appl. No.: 11/523,230

(22) Filed: Sep. 19, 2006

(65) Prior Publication Data

US 2007/0096868 A1 May 3, 2007

(30) Foreign Application Priority Data

Oct. 27, 2005 (EP) .................................... 05300873

(51) Int. Cl.

| | |
|---|---|
| ***H04Q 5/22*** | (2006.01) |
| ***H04Q 9/00*** | (2006.01) |
| ***G05B 23/00*** | (2006.01) |
| ***G06F 7/00*** | (2006.01) |
| ***G06F 7/04*** | (2006.01) |
| ***H04L 9/14*** | (2006.01) |
| ***H04L 9/32*** | (2006.01) |

(52) U.S. Cl. .................. 340/10.41; 340/10.42; 340/5.2; 340/5.21

(58) Field of Classification Search ............... 340/10.41, 340/10.42, 5.2, 5.21
See application file for complete search history.

(56) References Cited

U.S. PATENT DOCUMENTS

| | | | | |
|---|---|---|---|---|
| 5,475,378 | A * | 12/1995 | Kaarsoo et al. | 340/5.6 |
| 5,541,585 | A | 7/1996 | Duhame et al. | |
| 5,991,411 | A | 11/1999 | Kaufman et al. | |
| 6,435,763 | B1 * | 8/2002 | Sakane et al. | 404/25 |
| 6,570,487 | B1 * | 5/2003 | Steeves | 340/5.2 |
| 6,738,772 | B2 * | 5/2004 | Regelski et al. | 707/10 |
| 2003/0001722 | A1 | 1/2003 | Smith | |
| 2003/0197612 | A1 * | 10/2003 | Tanaka et al. | 340/572.1 |
| 2004/0021552 | A1 * | 2/2004 | Koo | 340/5.53 |
| 2004/0138535 | A1 | 7/2004 | Ogilvie | |
| 2004/0183682 | A1 | 9/2004 | Tenarvitz | |
| 2004/0230488 | A1 | 11/2004 | Beenau et al. | |
| 2005/0083171 | A1 | 4/2005 | Hamilton | |

(Continued)

FOREIGN PATENT DOCUMENTS

| | | | |
|---|---|---|---|
| DE | 19932147 | A1 | 2/2007 |
| EP | 15130884 | A1 | 3/2003 |
| JP | 11353510 | A | 12/1999 |
| WO | WO03060833 | A1 | 7/2003 |

*Primary Examiner* — Benjamin C Lee
*Assistant Examiner* — Andrew Bee
(74) *Attorney, Agent, or Firm* — Schmeiser, Olsen & Watts; John Pivnichny

(57) ABSTRACT

A method executed in a badge, a badge reader, and a server for controlling access to different zones. The badge obtains from the badge reader an invitation to request access to a zone Zout. The badge ascertains that the badge is authorized to access the zone Zout. The badge has a current badge identifier ID. The badge retrieves a zone-associated badge identifier IDout associated with the zone Zout. The badge issues to the badge reader a request for access to the zone Zout. The request includes: the current badge identifier ID, the zone-associated badge identifier IDout; and a current badge key K. The badge receives from the badge reader either an authorization to access the zone Zout during a specified period of time Tout or a refusal to grant access to the zone Zout. The server implements the distribution of keys used by the badge reader and badge.

16 Claims, 7 Drawing Sheets

U.S. PATENT DOCUMENTS

2005/0091338 A1 4/2005 de la Huerga
2005/0099288 A1* 5/2005 Spitz et al. .................... 340/506
2005/0264397 A1* 12/2005 Coelho et al. ................ 340/5.28
2006/0181393 A1* 8/2006 Raphaeli ...................... 340/10.1
2006/0255129 A1* 11/2006 Griffiths ........................ 235/382
2008/0246583 A1* 10/2008 Blake et al. .................... 340/5.7

* cited by examiner

MANAGEMENT OF BADGE ACCESS TO DIFFERENT ZONES

FIELD OF THE INVENTION

The present invention relates to security and more particularly to methods, systems, and computer programs for dynamically managing access to different areas with different security levels through use of badges and badge readers.

BACKGROUND OF THE INVENTION

The problem that the present invention proposes to solve can be illustrated by the following example. FIG. 1 represents a building belonging to a private company, with the following different areas, each area associated with a specific security level: a lobby, a briefing center, an open space, and a security center. The lobby, with a security level Z0, is a public area where anybody has access to. The briefing center, with a security level Z1, is an area of limited security, accessible to the customers of the company, wherein access to the briefing center is granted for the people holding a badge. The open space, with a security level Z2, is an area of high security, only accessible to the employees of the company, wherein access to the open space is granted for the people holding a badge. The security center, with a security level Z3, is an area of very high security, only accessible to security staff and authorized company personal, wherein access to the security center is granted for the people holding a badge.

The building layout does not allow all transitions between the different areas, and hence between the different security levels. With the previous building layout, conventional access techniques define different security levels, according to a given hierarchy, so that a badge can give access either to the level Z1 only, or to the levels Z0 and Z1, or to the levels Z0, Z1 and Z2, or to all the levels Z0 through Z3. With such a scheme, some security breaches are difficult to avoid, as shown with the following examples: any stolen badge granting access to a security level Zi can be used for fraudulently accessing areas with a security level lower than or equal to Zi; extended (and therefore suspicious) stay within a given area can't be easily detected; an attempt to move from security level Z3 to security level Z0 without passing through the security level Z2 can't be detected; update of access granting for a given area requires recalling all the badges giving access to this area.

Other examples can be identified for similar situations, where the system managing access to the different areas of a company building does not take into account the characteristics of the building layout and of the internal company security policy. Such characteristics can for instance dictate the following rules: staying within a given area for a duration above a predetermined threshold is a suspicious behavior; transition from a first given area to a second given area without passing through a third given area (typically a security "airlock") is a suspicious behavior; access code recorded on badges must be regularly updated to avoid stolen or duplicated badges granting access to malicious people All these types of constraints, such as the constraints illustrated in FIG. 1 or the ones illustrated by the former rule list are not properly and efficiently addressed by conventional means.

SUMMARY OF THE INVENTION

The present invention provides a method executed in a badge for having access to different zones with different security levels protected by badge readers, said method comprising:

obtaining, from a badge reader located external to the badge, an invitation to request access to a zone Zout to which the badge reader is adapted to grant access;

ascertaining that the badge is authorized to access the zone Zout, said badge having a current badge identifier ID;

responsive to said ascertaining, retrieving a zone-associated badge identifier IDout associated with the zone Zout;

issuing to the badge reader, in response to the received invitation and to said ascertaining, a request for access to the zone Zout, said request comprising: the current badge identifier ID, the zone-associated badge identifier IDout; and a current badge key K for comparison with a badge key Kin associated with a zone Zin where the badge reader is located; and receiving, from the badge reader in response to the request for access, either an authorization to access the zone Zout during a specified period of time Tout or a refusal to grant access to the zone Zout, wherein said obtaining, said ascertaining, said retrieving, said issuing, and said receiving in response to the request for access are performed by a processor within the badge.

The present invention provides method executed in a badge reader, for dynamically managing access to different protected zones with different security levels through use of badges, said method comprising:

detecting a badge located external to the badge reader;

issuing to the detected badge, an invitation to request access to a zone Zout to which the badge reader is adapted to grant access;

after said issuing the invitation, receiving from the badge a request for access to the zone Zout, said request comprising: a current badge identifier ID, a zone-associated badge identifier IDout associated with Zout; and a current badge key K for comparison with a badge key Kin associated with a zone Zin where the badge reader is located; and in response to the received request for access, supplying to the badge either an authorization to access the zone Zout during a specified period of time Tout or a refusal to grant access to the zone Zout, wherein said detecting, said issuing, said receiving the request for access, and said supplying are performed by a processor within the badge reader.

The present invention provides a method executed in a server connected to one or a plurality of badge readers, for dynamically managing access to different protected zones with different security levels through use of badges and badge readers, said method comprising:

upon reception by the server from a badge reader of a configuration request comprising a zone identifier corresponding to a zone Zin where the badge reader is located and a zone identifier corresponding to a zone Zout to which the badge reader gives access: transmitting by the server to the badge reader, a key Kin associated with the zone Zin, a key Kout associated with the zone Zout, and an IDlist table comprising a list of badge identifiers authorized to enter the zone Zout, wherein said transmitting is performed by a processor within the server.

DETAILED DESCRIPTION OF THE INVENTION

Principles of the Invention

The present invention discloses methods, systems and computer programs for dynamically managing access to different protected zones with different security levels through use of badges and badge readers, access control being performed both when entering and leaving a protected zone. Each area or zone protected by the method and system according to the present invention is identified by a unique Zone Identifier Z(i). Each zone can be accessed through a Key K(i) held by a badge and read by a reader.

Each zone is associated with a maximum time duration T(i) during which a badge is authorized to stay in the zone. Each badge within a zone Z(i) is identified by an Identifier ID(i). To move from a zone Z(i) to a zone Z(j), a badge with identifier ID(i) shows that it holds the key K(i), resulting in the badge receiving the key K(j) which allows afterwards to leave the zone Z(j). When a zone Z(i) is empty (i.e., no badge present in the zone), the server has the possibility to update the key K(i). Badge readers are not only used to enter a zone, but also to leave a zone. The key used to leave a zone is dynamically passed to the badge when this badge is used to enter in the zone. Keys are changed when a zone it empty.

Thus, the present invention: manages access to protected areas through use of badges and badge readers, where access control is performed both when entering and leaving an area; controls the time spent by a given badge within a given area; and may dynamically update a secret key used to access an area.

The present invention is directed to methods, systems and computer programs for managing access to different areas through badge readers and badges held by individuals and is applicable to environments where different levels of access security are defined.

Figure 7:
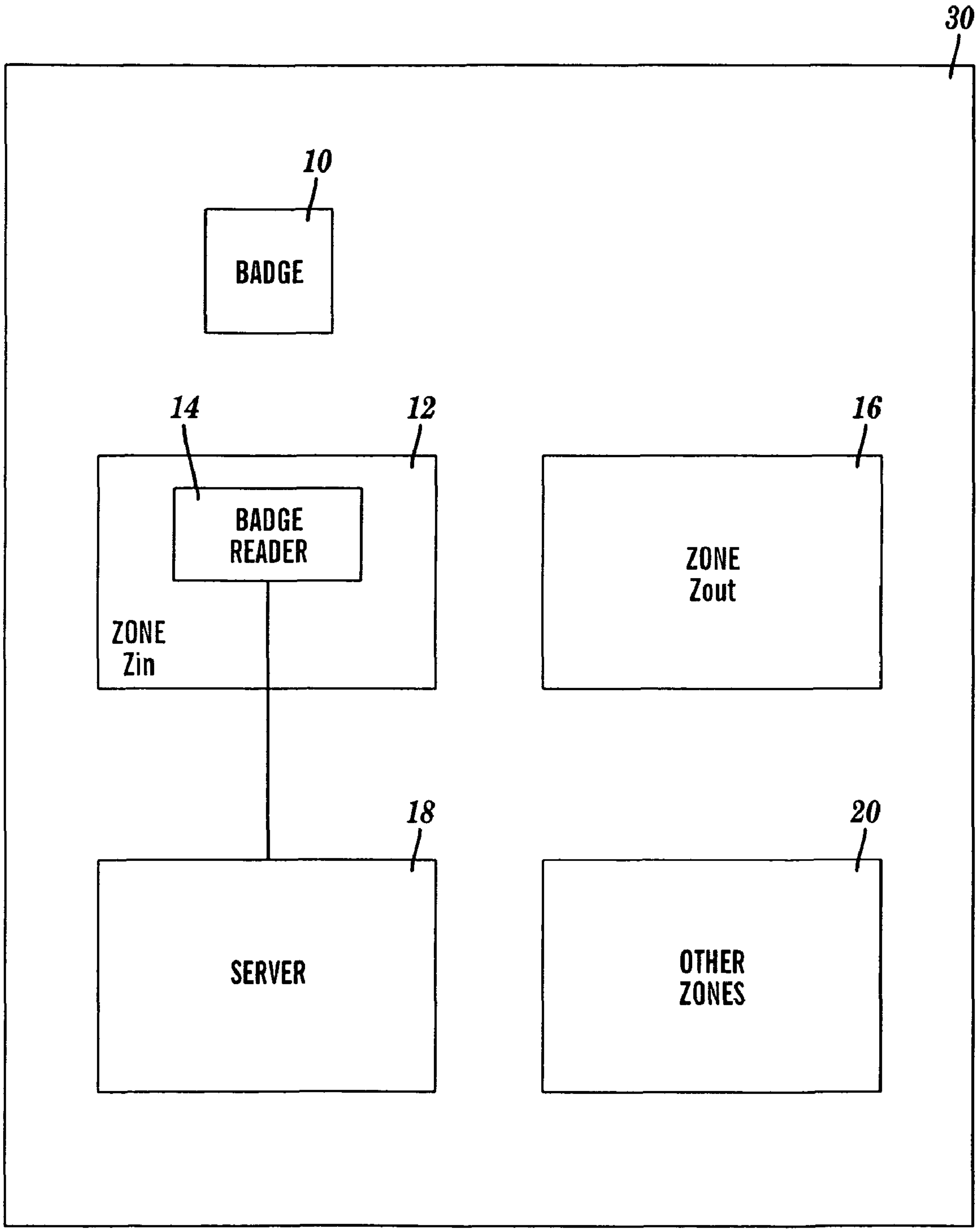
FIG. 7 depicts an area comprising zones, a badge reader, a badge, and a server, in accordance with embodiments of the present invention.

The method according to the present invention for managing badge access is based on a set of three different types of resources: badges, badge readers, and a central server, as illustrated in FIG. 7.

FIG. 7 depicts an area 30 (e.g., a building) comprising a badge reader 14 located in a zone Zin 12, a badge 10 adapted to send data to the badge reader 14 and to receive data from the badge reader 14, a zone Zout 16 to which the badge 10 seeks access, a server 18 adapted to send data to the badge reader 14 and to receive data from the badge reader 14, and other zones 20, in accordance with embodiments of the present invention. The badge reader 14 is located external to both the badge 10 and the server 18.

Badges, which are typically owned by employees/visitors, may comprise: a processor with an associated read/write permanent memory; means for managing timers; input/output means; and a built-in power source. The memory with the processor may be loaded with default values (e.g., during an initialization phase when leaving the manufacturing facility where the processor is fabricated). The input/output means are based on any conventional technology, such a magnetic tape, electrical contacts, or wireless communications.

The built-in power source, used to power the whole badge components. Such a power source can typically be implemented with: a conventional battery or photo voltaic cells, or any other conventional means that meet the badge form factor, mechanical and electrical constraints. Alternatively, the power source can be external to the badge, the badge being only powered when used, typically from the badge reader through electrical contacts, or through radio frequency induction, or through any other conventional means that meet the badge form factor, mechanical and electrical constraints.

Badge readers (or readers for short) that grant access to areas. In terms of hardware implementation, the badge reader includes: a processor with associated memory; means for managing timers; input/output means for controlling exchange of information with a badge; a gate controller for typically opening a door; networking means for controlling exchange of information with a central server, and a power source, typically fed from a conventional power line.

The central server is mainly involved in the distribution of the codes (keys) for delivering access to areas. In terms of hardware implementation, the central server includes: a processor with associated memory; means for managing timers; means for managing a user interface; networking means for controlling exchange of information with a badge reader, and a power source, typically fed a from conventional power line.

Figure 2:
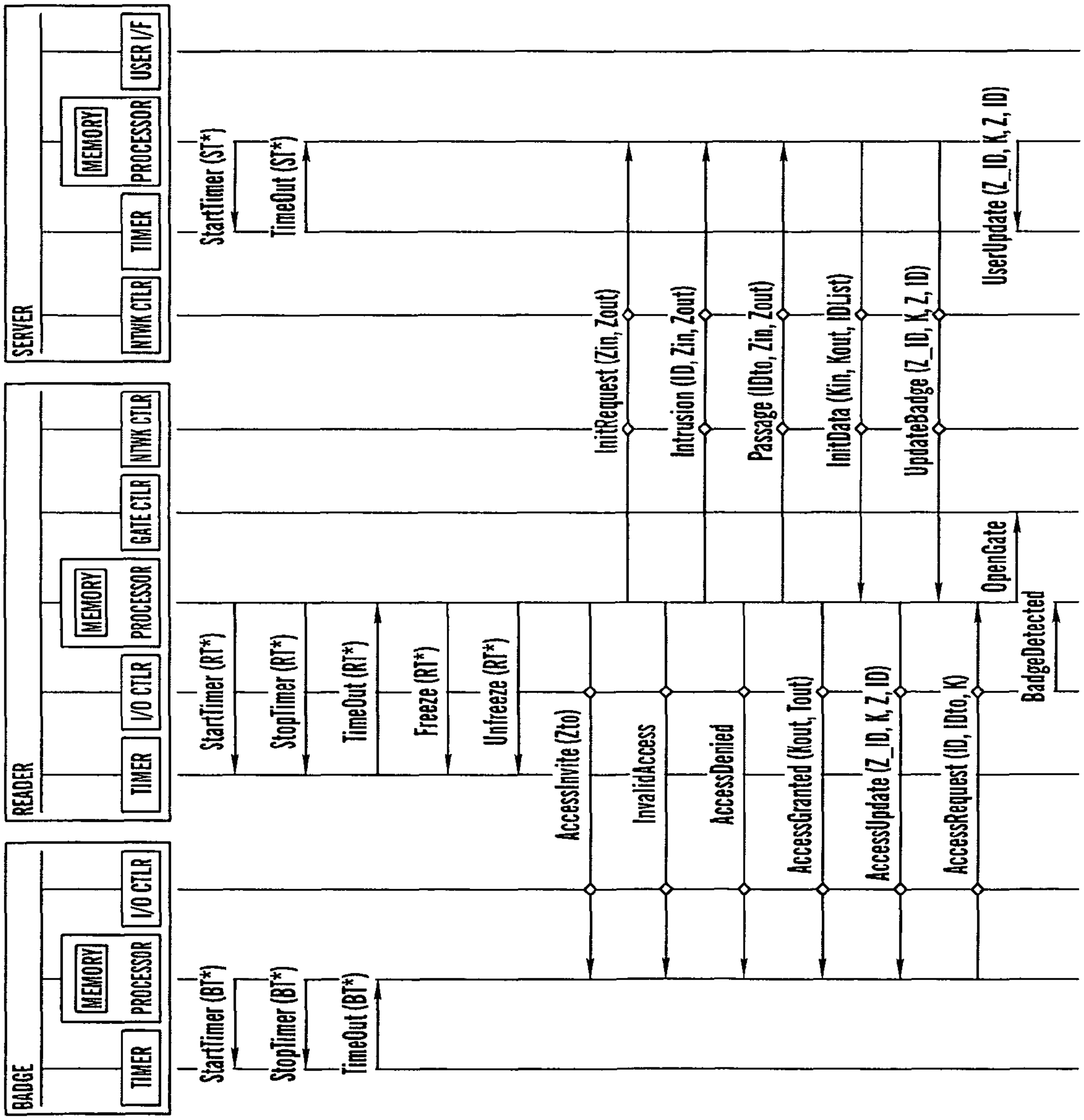
FIG. 2 shows the messages exchanged between badges, badge readers, and the central server, in accordance with embodiments of the present invention.

The method and system according to the present invention relies on the exchange of information between the aforementioned resources (badges, badge readers, and a central server), according to a set of messages as illustrated in FIG. 2, in accordance with embodiments of the present invention.

Figure 3:
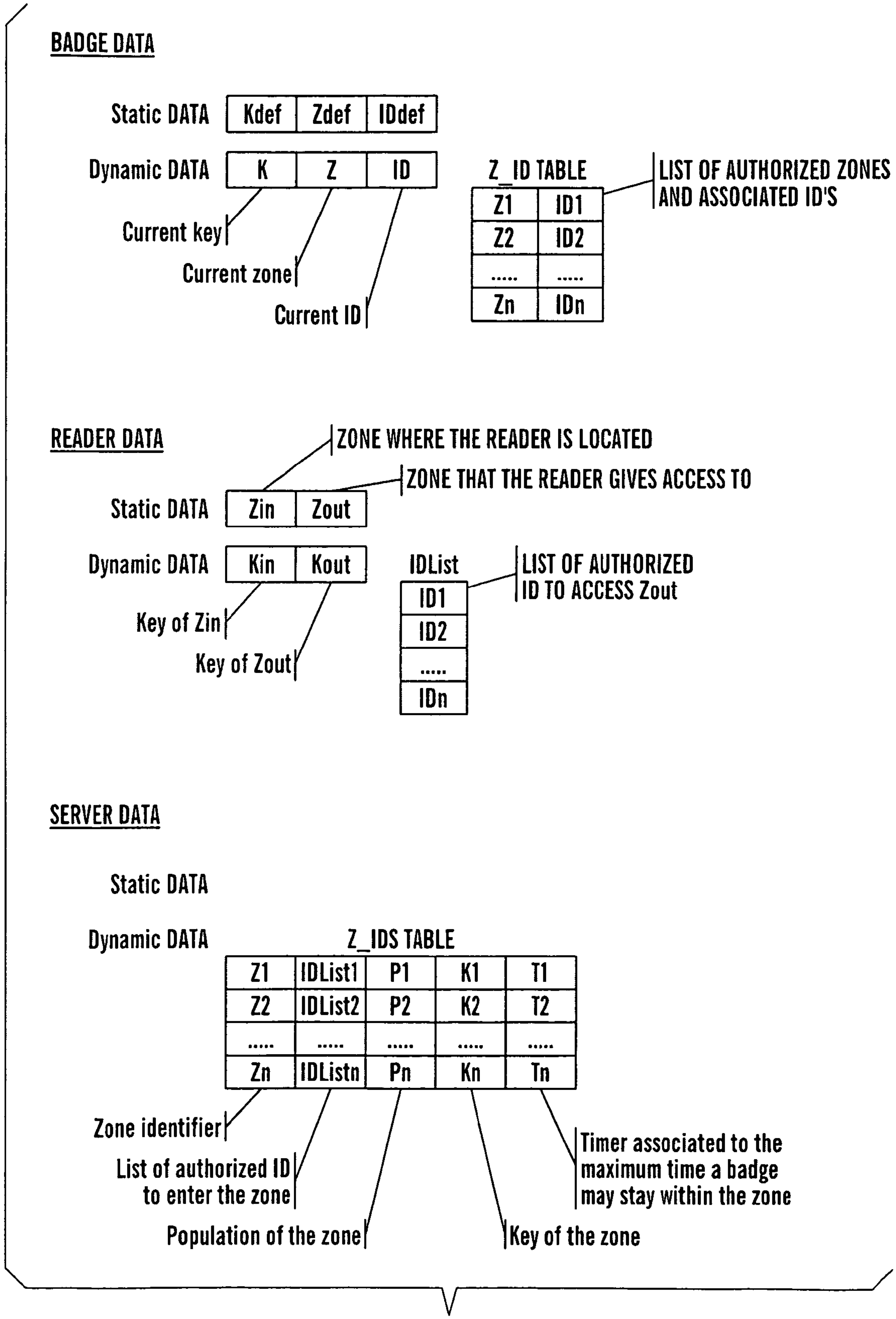
FIG. 3 describes the data used in the messages exchanged between badges, badge reader, and the central server, in accordance with embodiments of the present invention.

Furthermore the method and system according to the present invention relies on a set of data, within each of the aforementioned resources, as described in the FIG. 3, in accordance with embodiments of the present invention.

The following principles contribute to address different facets of the security problems.

Each area or zone protected by the method and system according to the present invention is identified by a unique Zone Identifier Z(i).

Each zone can be accessed through a Key K(i) hold by a badge and read by a reader.

Each zone is associated with a maximum time duration T(i) during which a badge is authorized to stay in the zone.

Each badge within a zone Z(i) is identified by an Identifier ID(i).

To move from a zone Z(i) to a zone Z(j), a badge with identifier ID(i) must show that it holds the key K(i). If it is the case, the badge receives the key K(j) which allows afterwards to leave the zone Z(j).

When a zone Z(i) is empty (no badge present in the zone), the server has the possibility to update the key K(i).

In accordance with the present invention: a badge reader can't stay indefinitely within a given zone; badge readers are not only used to enter a zone, but also to leave a zone; the key used to leave a zone is dynamically passed to the badge when this badge is used to enter in the zone; keys are changed when a zone it empty.

Badge Data, Badge Reader Data, and Server Data

The present invention relies on different methods executed in the badges, the readers and the central servers. These methods use a protocol shared between these objects, based on the primitives described in FIG. 2, and on the different pieces of data (badge date, reader data, server data) shown in FIG. 3, and specified next.

Badge data comprises static data and dynamic data. As static data, the badge holds: a default key Kdef; a default zone identifier Zdef; and a default Identifier IDdef. The preceding pieces of badge data are used when a badge is first initialized. As dynamic data, the badge holds: a current key K; a current zone identifier Z; and a current Identifier ID. The preceding dynamic data correspond to the zone where the badge is currently in. A table (Z_ID table) records pairs of the form (Z(i),ID(i)), each pair informing which zone the badge has access to and under which Identifier this badge is known in this zone.

Badge reader data comprises static data and dynamic data. As static data, the badge reader holds: a Zone identifier Zin, corresponding to the zone where the badge reader is located; and a Zone identifier Zout, corresponding to the zone to which the badge reader gives access. As dynamic data, the badge reader holds: a Key Kin, associated with Zin; a Key Kout, associated with Zout; and an IDlist table recording the list of authorized badge identifier ID(i) for entering the zone Zout.

Server Data comprises dynamic data. As dynamic data, the server holds a table Z_IDS, where each record comprises the following fields: a zone identifier Z(i); the list IDlist(i) of authorized badger identifier for entering in the zone Z(i); a population P(i) counting the number of badges present in the zone Z(i); a Key K(i), associated with the zone identifier Z(i), and a timer T(i) associated with the maximum time a badge can stay in Z(i). If the value of this timer is found equal to 0, then there is no time limitation for staying within the zone Z(i).

The preceding data (badge date, reader data, server data) are used as arguments of the primitives defined in FIG. 2, and exchanged according to the different methods implemented in the badges, in the badge readers, and in the central server.

Method Carried Out by the Badges

Figure 4:
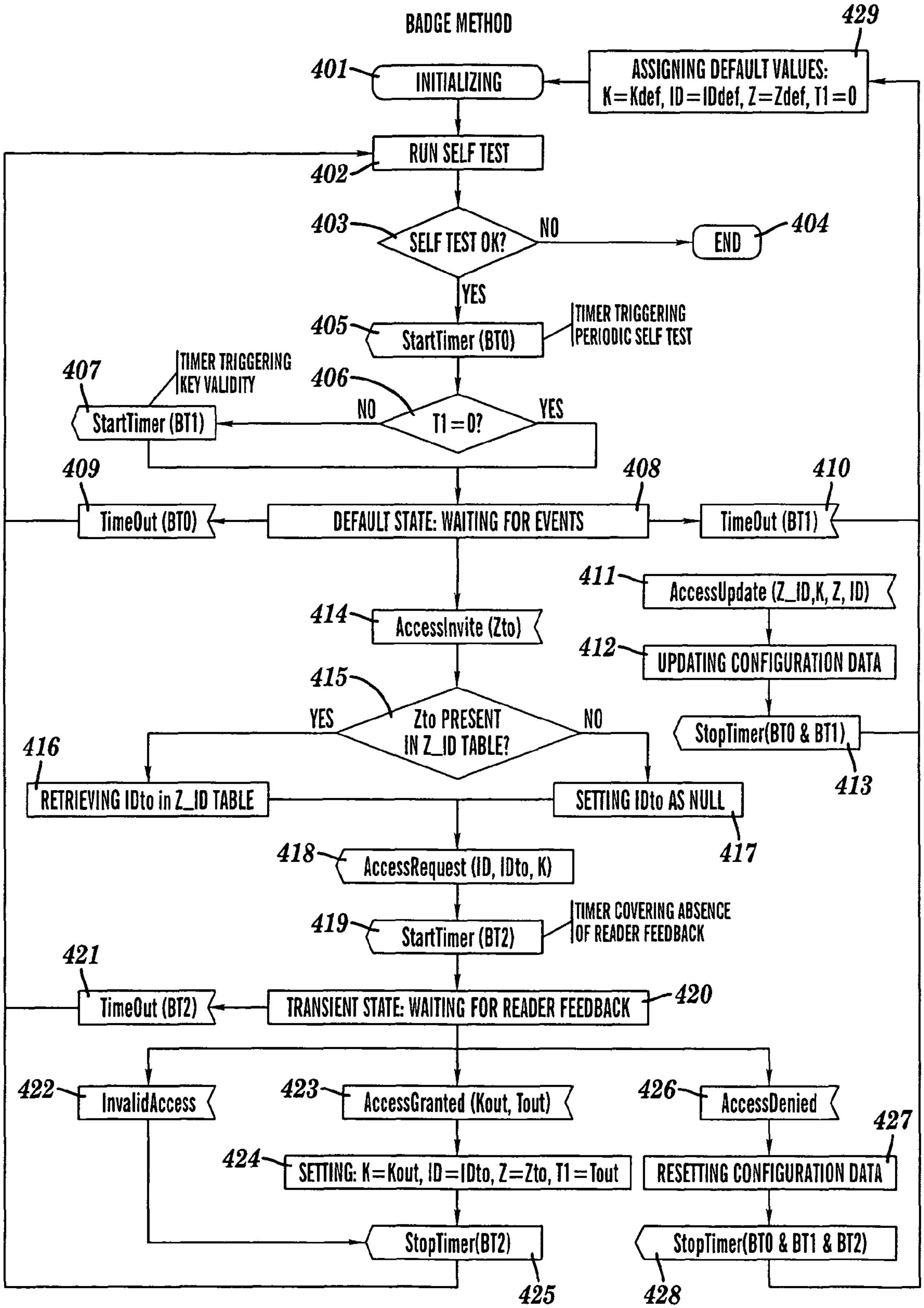
FIG. 4 is a flow chart of a method carried out by the badge, in accordance with embodiments of the present invention.

The method carried out by the badge is described in the flow chart of FIG. 4, in accordance with embodiments of the present invention. This method may be implemented as a software program comprising instructions stored in a computer readable medium within the badge, said instructions adapted to be executed by the processor within the badge, said processor adapted to access data stored in a memory component within the badge. This method comprises the following steps.

At step 401, during an initialization phase, the method starts its operating system.

At step 402 a self test is executed to check whether or not the badge operates as expected.

At step 403 a test is performed to check whether or not the self test result is correct. If the self test result is correct, then control is given to step 405; otherwise control is given to step 404.

At step 404, the badge method aborts if the self test has failed and the badge is considered as being inoperative.

At step 405, a StartTimer(BT0) primitive is issued to the badge timer handler, in order to start a timer BTO. This timer will be used to trigger periodic self tests.

At step 406 a test is performed to check whether or not the local variable T1 is equal to zero (0). If the local variable T1 is equal to zero (0), then control is given to step 408; otherwise control is given to step 407.

At step 407, a StartTimer(BT1) primitive is issued to the badge timer handler, in order to start a timer BT1, with a time-out duration equal to T1. This timer will be used to trigger key validity: the key will be reset if this timer reaches a time-out condition (see step 410).

At step 408, the badge method is in its default state, waiting for events corresponding to the reception of primitives (see steps 409, 410, 411, and 414).

At step 409, a TimeOut(BT0) primitive is received from the badge timer handler. Control is then given to step 402 for running a periodic self test.

At step 410, a TimeOut(BT1) primitive is received from the badge timer handler. Control is given to step 429 for resetting the current key.

At step 411, an AccessUpdate(Z_ID, K, Z, ID) primitive is received from the badge reader.

At step 412, the badge configuration data are updated as follows:

- by replacing the current Z_ID table with the first argument of the received AccessUpdate(Z_ID, K, Z, ID) primitive;
- by replacing the badge current key K by the second argument of the received Access Update(Z_ID, K, Z, ID) primitive;
- by replacing the badge current zone identifier Z by the third argument of the received AccessUpdate(Z_ID, K, Z, ID) primitive; and
- by replacing the badge current identifier ID by the fourth argument of the received Access Update(Z_D, K, Z, ID) primitive.

At step 413, a StopTimer(BTO) primitive and a StopTimer (BT1) primitive are issued to the badge timer handler, in order to stop the timers BTO and BT1. Then control is given back to the step 429.

At step 414, an AccessInvite(Zto) primitive is received from the badge reader.

At step 415, a test is performed to check whether or not the zone identifier Zto is found present in the Z_ID table. If the zone identifier Zto is found present in the Z_ID table, then control is given to step 416; otherwise control is given to step 417.

At step 416, the identifier IDto associated with the zone identifier Zto is retrieved from the Z_ID table. Then control is given to step 418.

At step 417, the identifier IDto is initialized with a null value (0).

At step 418, an AccessRequest(ID, IDto, K) primitive is issued to the badge reader.

At step 419, a StartTimer(BT2) primitive is issued to the badge timer handler, in order to start a timer BT2. This timer will be used to trigger the absence of badge reader feedback.

At step 420, the badge method is in a transient state, waiting for a feedback from the badge reader (see steps 421, 422, 423, and 426).

At step 421, a TimeOut(BT2) primitive is received from the badge timer handler. Control is then given to step 402 for running a periodic self test.

At step 422, an InvalidAccess primitive is received from the badge reader. Then control is given to step 425.

At step 423, an AccessGranted(Kout, Tout) primitive is received from the badge reader.

At step 424,

- the current key K takes the value of the received key Kout;
- the current identifier ID takes the value of the identifier IDto;
- the current zone identifier Z takes the value of the zone identifier Zto; and
- finally a local variable T1 is set equal to the received value Tout.

At step 425, a StopTimer(BT2) primitive is issued to the badge timer handler, in order to stop the timer BT2. Then control is given back to the step 402.

At step 426, an AccessDenied primitive is received from the badge reader.

At step 427, all the badge configuration data are reset.

At step 428, a StopTimer(BT0) primitive, a StopTimer (BT1) primitive, and a StopTimer(BT2) primitive are issued to the badge timer handler, in order to stop the timers BT0, BT1, and BT2.

At step 429, default values are assigned to the variables associated with the badge (as it is done when a brand new badge leaves manufacturing):

the current key K takes the value of the default key Kdef;

the current identifier ID takes the value of the default identifier IDdef, the current zone identifier Z takes the value of the default zone identifier Zdef; and a local variable T1 is set equal to the zero value (0).

Then control is given back to the initial step 401.

Method Carried Out by the Badge Readers

Figure 5:
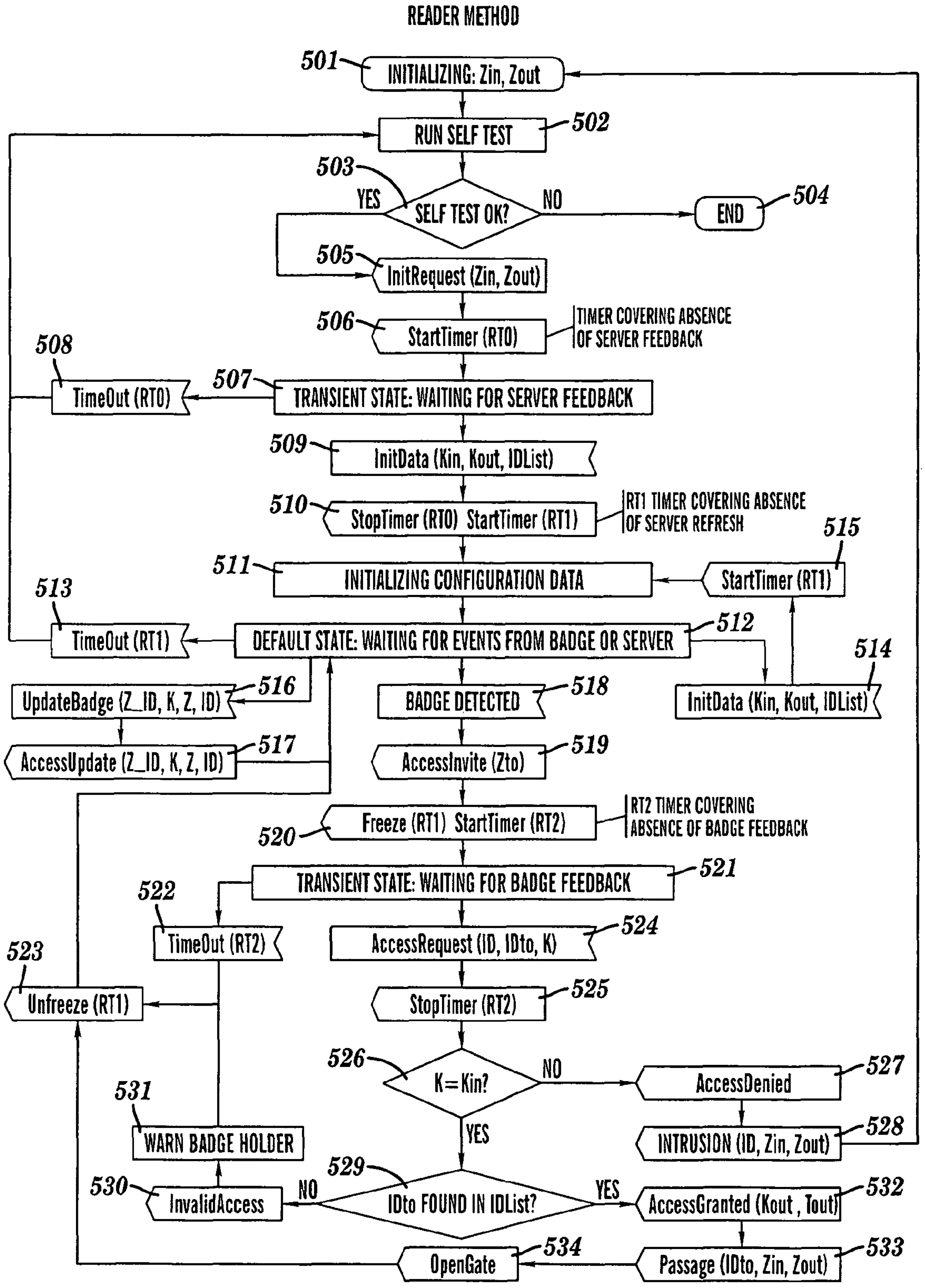
FIG. 5 is a flow chart of a method carried out by the badge reader, in accordance with embodiments of the present invention.

The method carried out by the badge reader is described in the flow chart of FIG. 5, in accordance with embodiments of the present invention. This method may be implemented as a software program comprising instructions stored in a computer readable medium within the badge reader, said instructions adapted to be executed by the processor within the badge reader, said processor adapted to access data stored in a memory component within the badge reader. This method comprises the following steps.

At step 501, during an initialization phase, the badge reader method starts its operating system and loads the zone identifiers Zin and Zout from its static configuration data.

At step 502, a self test is executed to check that the badge reader operates as expected.

At step 503, a test is performed to check whether or not the self test result is correct.

If the self test result is correct, then control is given to step 505; otherwise control is given to step 504.

At step 504, the badge reader methods aborts if the self test has failed and the badge reader is considered as being inoperative.

At step 505, an InitRequest(Zin, Zout) primitive is issued to the server, in order to receive initial configuration data.

At step 506, a StartTimer(RT0) primitive is issued to the badge reader timer handler, in order to start a timer RT0. This timer will be used to trigger the absence of server feedback.

At step 507, the badge reader method is in a transient state, waiting for the server feedback (see steps 508, and 509).

At step 508, a TimeOut(RT0) primitive is received from the badge reader timer handler. Control is then given to step 502 for running a periodic self test.

At step 509, an InitData(Kin, Kout, Idlist) primitive is received from the server.

At step 510, a StopTimer(RT0) primitive and a StartTimer (RT1) primitive are issued to the badge reader timer handler, in order to stop the timer RT0, and to start the timer RT1 covering the absence of server refresh.

At step 511, the badge reader configuration data Kin, Kout and IDlist are initialized with the parameters of the primitive InitData(Kin, Kout, Idlist) received at step 509.

At step 512, the badge reader method is in its default state, waiting for events corresponding to the reception of primitives (see steps 513, 514, 516, and 518).

At step 513, a TimeOut(RT1) primitive is received from the badge reader timer handler. Control is then given to step 502 for running a periodic self test.

At step 514, an InitData(Kin, Kout, Idlist) primitive is received from the server.

At step 515, a StartTimer(RT1) primitive is issued to the badge reader timer handler, in order to restart the timer RT1 covering the absence of server refresh. Then control is given to step 511.

At step 516, an UpdateBadge(Z_ID, K, Z, ID) primitive is received from the server.

At step 517, an AccessUpdate(Z_ID, K, Z, ID) primitive is issued to the badge. Then control is given to step 512.

At step 518, a BadgeDetected primitive is received from the badge reader I/O Controller, as a notification that a badge has been detected.

At step 519, an AccessInvite(Zto) primitive is issued to the badge.

At step 520, a Freeze(RT1) primitive and a StartTimer (RT2) primitive are issued to the badge reader timer handler, in order to freeze the timer RT1, and to start the timer RT2 covering the absence of badge feedback.

At step 521, the badge reader method is in a transient state, waiting for the badge reader feedback (see steps 522, and 524).

At step 522, a TimeOut(RT2) primitive is received from the badge reader timer handler.

At step 523, an Unfreeze(RT1) primitive is issued to the badge reader timer handler, in order to unfreeze the timer RT1. Then control is given to step 512.

At step 524, an AccessRequest(ID, IDto, K) primitive is received from the badge.

At step 525, a StopTimer(RT2) primitive is issued to the badge reader timer handler, in order to stop the timer RT2.

At step 526, a test is performed to check whether or not the key K received as last parameter of the AccessRequest(ID, IDto, K) primitive received at step 524 is equal to the local key Kin. If the key K received as last parameter of the AccessRequest(ID, IDto, K) primitive received at step 524 is equal to the local key Kin, then control is given to step 529; otherwise control is given to step 527.

At step 527, an AccessDenied primitive is issued to the badge.

At step 528, an Intrusion(ID, Zin, Zout) primitive is issued to the server. Then control is given to step 501.

At step 529, a test is performed to check whether or not the identifier IDto is found within the IDlist table.

If the identifier IDto is found within the IDlist table, then control is given to step 532; otherwise control is given to step 530.

At step 530, an InvalidAccess primitive is issued to the badge.

At step 531, the badge holder is warned through conventional means, such as, but not limited to, an audible message, or a visible message. Then control is given to step 523.

At step 532, an AccessGranted(Kout, Tout) primitive is issued to the badge.

At step 533, a Passage(IDto, Zin, Zout) primitive is issued to the server.

At step 534, an OpenGate primitive is issued to the gate controller, for giving access to the badge holder. Then control is given to step 523.

Method Carried Out by the Central Server

Figure 6:
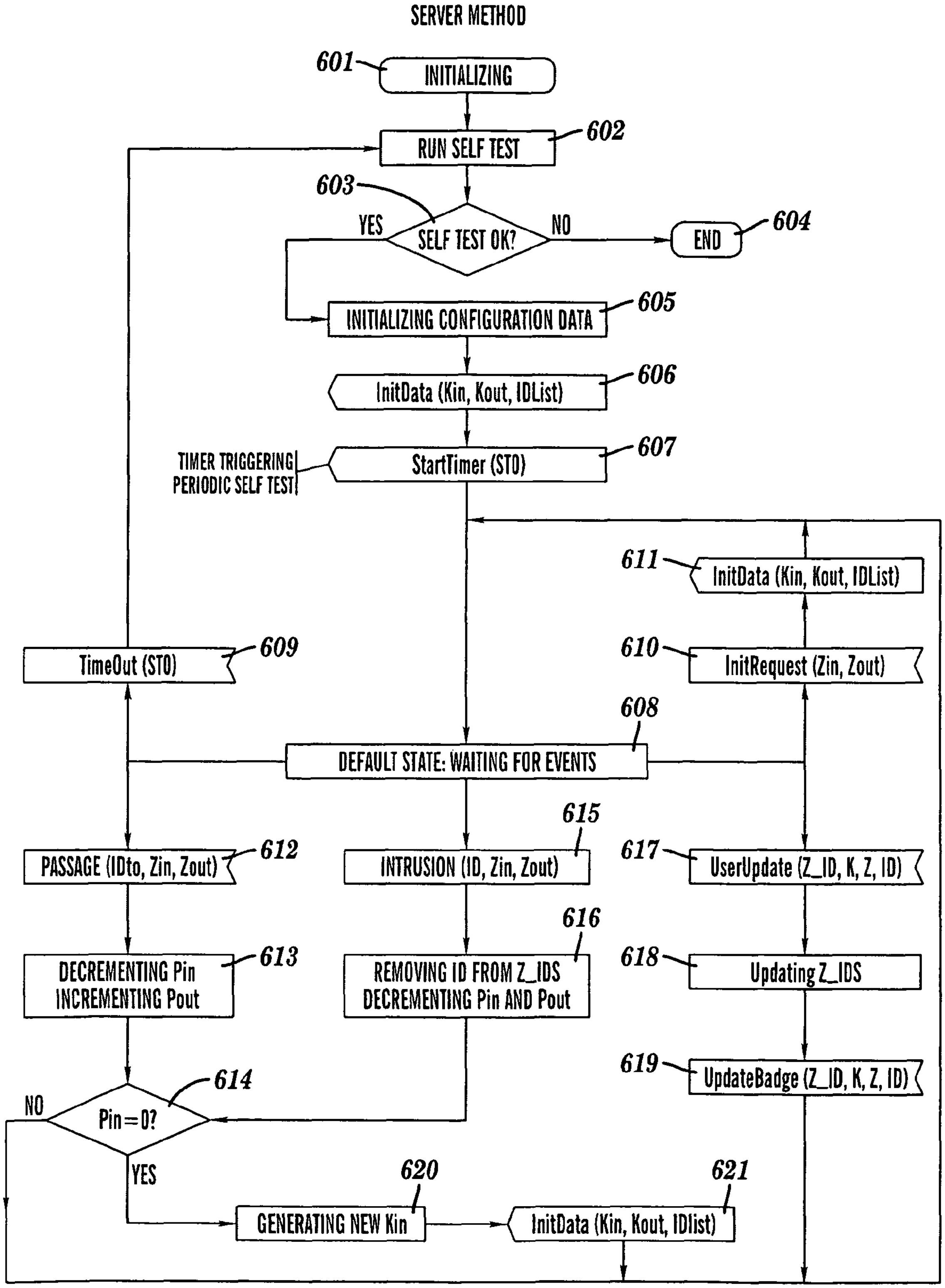
FIG. 6 is a flow chart of a method carried out by the central server, in accordance with embodiments of the present invention.

The method carried out by the central server is described in the flow chart of FIG. 6, in accordance with embodiments of the present invention. This method may be implemented as a software program comprising instructions stored in a computer readable medium within the server, said instructions adapted to be executed by the processor within the server, said processor adapted to access data stored in a memory component within the server. This method comprises the following steps.

At step 601, during an initialization phase, the server method starts its operating system.

At step 602, a self test is executed to check that the server operates as expected.

At step 603, a test is performed to check if the self test result is correct.

If the self test result is correct, then control is given to step 605; otherwise control is given to step 604.

At step 604, the server method aborts as the self test has failed and the server is considered as being no longer operative.

At step 605, the configuration data is initialized by loading in memory the Z_IDS table.

At step 606, an InitData(Kin, Kout, IDlist) primitive is issued to the badge reader.

At step 607, a StartTimer(ST0) primitive is issued to the server timer handler, in order to start a timer STO. This timer will be used to trigger periodic self tests.

At step 608, the server method is in its default state, waiting for events corresponding to the reception of primitives (see steps 609, 610, 612, 615, and 617).

At step 609, a TimeOut(STO) primitive is received from the server timer handler. Control is then given to step 602 for running a periodic self test.

At step 610, an InitRequest(Zin, Zout) primitive is received from the badge reader.

At step 611, an InitData(Kin, Kout, IDlist) primitive is issued to the badge reader:

- the parameter Kin is retrieved from the Z_IDS table as the Key field of the record containing a zone identifier equal to Zin;
- the parameter Kout is retrieved from the Z_IDS table as the Key field of the record containing a zone identifier equal to Zout;
- the IDlist parameter is retrieved from the Z_IDS table as the IDlist field of the record containing a zone identifier equal to Zout.

At step 612, a Passage(IDto, Zin, Zout) primitive is received from the badge reader.

At step 613, the Z_IDS table is updated:

- by decrementing the Pin field in the record where the zone identifier is equal to Zin; and
- by incrementing the Pout field in the record where the zone identifier is equal to Zout.

At step 614, a test is performed to check whether or not the Pin variable is equal to zero (0). If the Pin variable is equal to zero (0), then control is given to step 620; otherwise control is given to step 608.

At step 615, an Intrusion(ID, Zin, Zout) primitive is received from the badge reader.

At step 616, the Z_IDS table is updated:

- by removing ID in the Idlist field, and
- by decrementing the Pin field in the record where the zone identifier is equal to Zin.

Then control is given to step 614.

At step 617, an UserUpdate(Z_D, K, Z, ID) primitive is received from the user interface controller in the server.

At step 618, the Z_IDS table is updated for reflecting the update of user access rights, as specified in the received primitive UserUpdate(Z_ID, K, Z, ID): for each record (Z*, ID*) of the Z_ID table, the specified identifier ID* is added to the IDlist field within the Z_IDS record whose the zone identifier is equal to Z*.

At step 619, an UpdateBadge(Z_ID, K, Z, ID) primitive is issued to the badge reader. Then control is given to step 608.

At step 620, a new key Kin is generated. This new key can be based on any conventional means used for generating random numbers.

At step 621, an InitData(Kin, Kout, Idlist) primitive is issued to the badge reader. Then control is given to step 608.

Initialization Step

Figure 1:
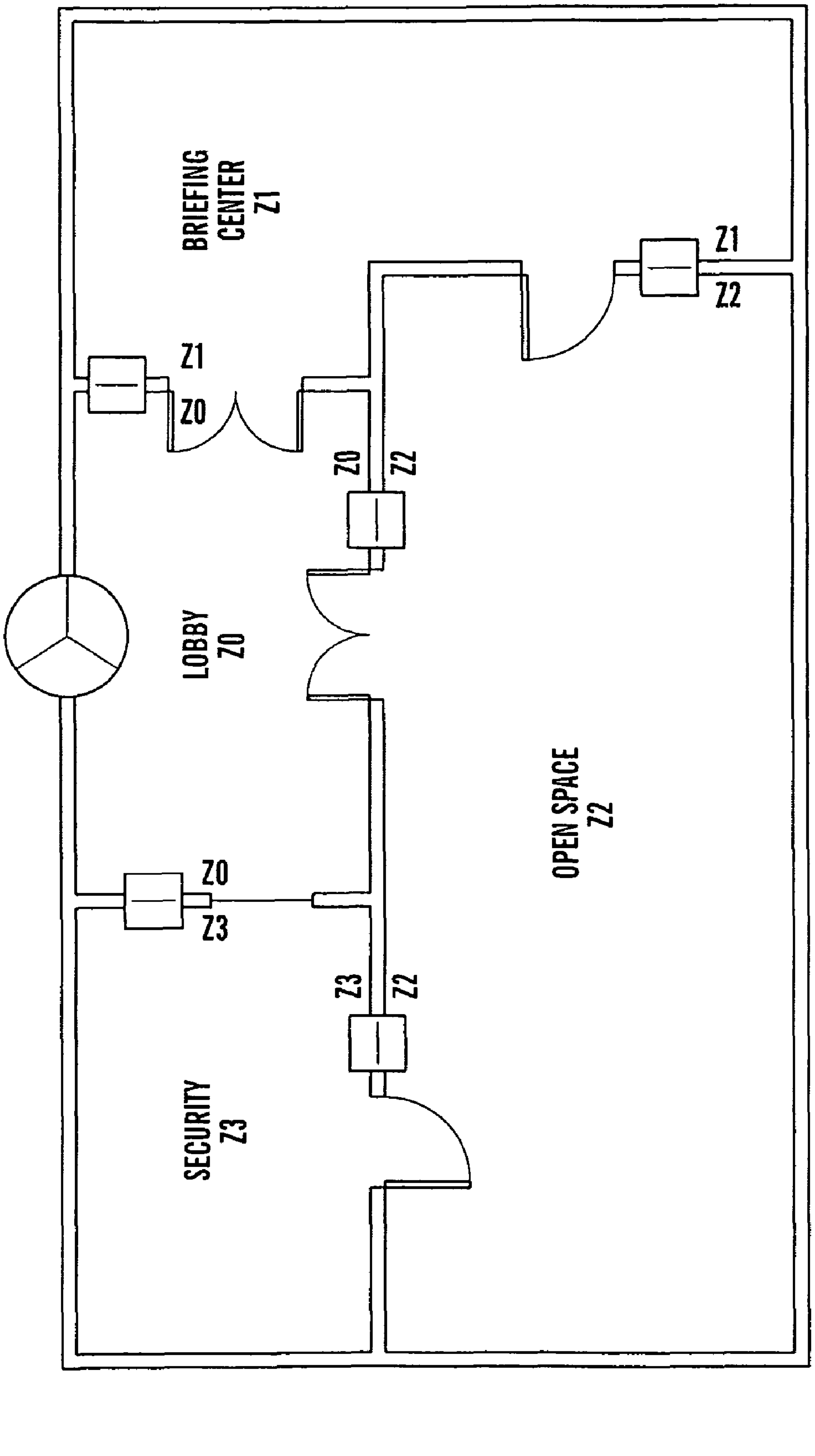
FIG. 1 represents a building belonging to a private company, with different areas, each of them associated with a specific security level.

An initialization step first defines the table Z_ID in the badge and the table Z_IDS in the server. This initialization step is conducted through a dedicated reader, such as the reader shown in FIG. 1 at the boundary between the lobby Z0 and the security center Z3.

Primitives

The different primitives used in the present invention are summarized in the following Table 1, where the words "badge", "reader" and "server" have been respectively shortened into "B", "R" and "S":

TABLE 1

| Primitive | From | To | Purpose/Comment |
|---|---|---|---|
| StartTimer(xT) | Processor in B/R/S | Timer in B/R/S | For starting a timer whose time-out is xT |
| StopTimer | Processor in B/R/S | Timer in B/R/S | For stopping the started timer with time-out xT |
| TimeOut(xT) | Processor in B/R | Timer in B/R | For notifying that the time-out duration has been elapsed |
| Freeze(RT) | Processor in R | Timer in R | For freezing the started timer with time-out RT |
| Unfreeze(RT) | Processor in R | Timer in R | For restarting the freezed timer with time-out RT |
| BadgeDetected | I/O Ctrl in R | Processor in R | For notifying that a badge is detected in the reader |
| OpenGate | Processor in R | Gate Ctlr in R | For asking to open the gate |
| AccessInvite(Zto) | Processor in R | Processor in B | For inviting the badge to ask for access to zone Zto. This message is |

TABLE 1-continued

| Primitive | From | To | Purpose/Comment |
|---|---|---|---|
| | | | relayed through the I/O Ctrl of both R and B |
| AccessRequest(ID, IDto, K) | Processor in B | Processor in R | For requesting access to a zone. ID is the current badge identifier (in Zin), IDto is the badge ID in the target zone, and K is the key of the target zone. |
| AccessDenied | Processor in R | Processor in B | For denying zone access, due to a wrong parameter K in the access request |
| InvalidAccess | Processor in R | Processor in B | For invalidating zone access, due to a wrong IDto parameter in the access request |
| AccessGranted(Kout, Tout) | Processor in R | Processor in B | For giving zone access to Zout, associated with Key Kout and timer Tout. |
| AccessUpdate(Z_ID, K, Z, ID) | Processor in R | Processor in B | For updating data in the Z_ID table. |
| InitRequest(Zin, Zout) | Processor in R | Processor in S | For requesting initialization data for the reader from Zin to Zout. |
| InitData(Kin, Kout, IDlist) | Processor in S | Processor in R | For passing initialization data to the reader from Zin to Zout. |
| Intrusion(ID, Zin, Zout) | Processor in R | Processor in S | For notifying an intrusion of badge ID (same case as for AccessDenied) |
| Passage(IDto, Zin, Zout) | Processor in R | Processor in S | For notifying a passage from Zin to Zout of the badge IDto. |
| UpdateBadge(Z_ID, K, Z, ID) | Processor in S | Processor in R | For updating data in the Z_ID table. |
| UserUpdate(Z_ID K, Z, ID) | User I/F in S | Processor in S | For updating data in the Z_ID table. |

For the above primitives, their parameters can be advantageously encrypted through conventional ciphering means.

Alternate Embodiment

In an alternate embodiment of the present invention, the key K associated to a given zone can furthermore be instantiated by badge. This can be achieved, when a key K is exchanged between a badge reader and a badge with identifier ID, by replacing the key K by the result of a hashing function fed with both the zone key K and the badge identifier ID: Hash(K,ID). This new key K'=Hash(K,ID) will be unique for each pair (K,ID) and can replace the key parameter K in the primitives AccessRequest(ID, IDto, K), AccessGranted(Kout, Tout), AccessUpdate(Z_ID,K,Z,ID). Without requiring additional memory field in the different tables and data associated to the badges and badge readers, this new key K' facilitates keeping the zone key K hidden. Outputs of hashing functions have a fixed-length, typically 128 bits for MD5 (See: "The MD5 Message-Digest Algorithm" RFC 1321 from R. Rivest), or 160 bits for SHA-1 (See "Secure Hash Algorithm 1" RFC 3174).

While the invention has been particularly shown and described with reference to a preferred embodiment, it will be understood that various changes in form and detail may be made therein without departing from the spirit, and scope of the invention. Various modifications to the embodiments and the generic principles and features described herein will be readily apparent to those skilled in the art. Thus, the present invention is not intended to be limited to the embodiment shown but is to be accorded the widest scope consistent with the principles and features described herein.

What is claimed is:

1. A method executed in a badge for having access to different zones with different security levels protected by badge readers, said method comprising:

obtaining, from a badge reader located external to the badge, an invitation to request access to a zone Zout to which the badge reader is adapted to grant access, said badge including a current zone identifier Z which authorizes the badge to access the zone Z;

responsive to said obtaining the invitation, ascertaining that the badge is authorized to access the zone Zout, said badge having a current badge identifier ID;

responsive to said ascertaining, retrieving a zone-associated badge identifier IDout associated with the zone Zout;

issuing to the badge reader, in response to the received invitation and to said ascertaining, a request for access to the zone Zout, said request comprising: the current badge identifier ID, the zone-associated badge identifier IDout, and a current badge key K or comparison with a badge key Kin associated with a zone Zin where the badge reader is located; and receiving, from the badge reader in response to the request for access, an authorization to access the zone Zout during a specified period of time Tout, wherein a badge key Kout for leaving the zone Zout is received by the badge in conjunction with said authorization;

after said authorization has been received from the badge reader, replacing in the badge:

the current badge key K with the received badge key Kout, the current badge identifier ID with the zone-associated badge identifier IDout, and the current zone identifier Z with the identifier of the zone Zout which authorizes the badge to access the zone Zout instead of the zone Z;

wherein said obtaining, said ascertaining, said retrieving, said issuing, and said receiving the authorization are performed by a processor within the badge.

2. The method of claim 1, wherein responsive to expiration of the period of time Tout, the method further comprises replacing in the badge: the current badge key Kout by a default badge key Kdef, the current badge identifier IDout by a default badge identifier IDdef, and the current zone identifier Zout by a default zone identifier Zdef.

3. The method of claim 1, wherein a current Z_ID table of zone identifiers is stored in the badge, and wherein the method further comprises receiving from the badge reader an access update for replacing in the badge: the current table Z_ID table with a new table, the current badge key K by a new badge key, the current zone identifier Z by a new zone identifier which authorizes the badge to access the new zone instead of the zone Z, and the current badge identifier ID by a new badge identifier.

4. A badge comprising a badge processor adapted to execute instructions of a software program to perform the method of claim 1, said badge processor being the processor within the badge.

5. A computer readable storage medium comprising instructions for performing the method of claim 1 through execution of said instructions by the processor within the badge, said computer readable storage medium being within the badge.

6. A method executed in a badge reader, for dynamically managing access to different protected zones with different security levels through use of badges, said method comprising:

detecting a badge located external to the badge reader;

issuing to the detected badge, an invitation to request access to a zone Zout to which the badge reader is adapted to grant access;

after said issuing the invitation, receiving from the badge a request for access to the zone Zout, said request comprising: a current badge identifier ID, a zone-associated badge identifier IDout associated with Zout, and a current badge key K for comparison with a badge key Kin associated with a zone Zin where the badge reader is located; and in response to the received request for access, supplying to the badge an authorization to access the zone Zout during a specified period of time Tout, said supplying being responsive to: determining by the badge reader that the current badge key K is equal to the badge key Kin, and determining by the reader that the zone-associated badge identifier IDout authorizes access to the zone Zout:

wherein said detecting, said issuing, said receiving the request for access, and said supplying are performed by a processor within the badge reader, and wherein said authorization comprises providing to the badge a badge key Kout to leave the zone Zout.

7. The method of claim 6, wherein the method further comprises prior to said detecting:

said processor within the badge reader storing a zone identifier corresponding to Zin and a zone identifier corresponding to Zout in a memory within the badge reader;

said processor within the badge reader sending a configuration request to a server located external to both the badge and the badge reader, said configuration request comprising the zone identifier corresponding to Zin and the zone identifier corresponding to Zout; and said processor within the badge reader receiving, from the server after sending the configuration request: Kin, a key Kout associated with Zout, and an IDlist table comprising a list of authorized badges for the zone Zout.

8. The method of claim 6, wherein the method further comprises generating, by the processor within badge reader, a new badge key to replace the received current badge key K by feeding a hashing function with both the badge key Kin and the received current badge identifier ID.

9. A badge reader comprising a badge reader processor adapted to execute instructions of a software program to perform the method of claim 6, said badge reader processor being the processor within the badge reader.

10. A computer readable storage medium comprising instructions for performing the method of claim 6 through execution of said instructions by the processor within the badge reader, said computer readable storage medium being within the badge reader.

11. A method executed in a server connected to one or a plurality of badge readers, for dynamically managing access to different protected zones with different security levels through use of badges and badge readers, said method comprising:

upon reception by the server from a badge reader of a configuration request comprising a zone identifier corresponding to a zone Zin where the badge reader is located and a zone identifier corresponding to a zone Zout to which the badge reader gives access: transmitting by the server to the badge reader, a key Kin associated with the zone Zin, a key Kout associated with the zone Zout, and an IDlist table comprising a list of badge identifiers authorized to enter the zone Zout, wherein said transmitting is performed by a processor within the server;

upon reception by the server from the badge reader of a message indicating an authorization of access of a badge to the zone Zout and comprising an identifier IDout of the badge, a zone identifier corresponding to Zin, and a zone identifier corresponding to Zout, decrementing by the server the number Pin of badges present in the zone Zin, and if after said decrementing Pin is equal to zero then sending to the badge reader a new key Kin associated with the zone Zin; and after said decrementing, incrementing by the server the number Pout of badges present in the zone Zout.

12. A method executed in a server connected to one or a plurality of badge readers, for dynamically managing access to different protected zones with different security levels through use of badges and badge readers, said method comprising:

upon reception by the server from a badge reader of a configuration request comprising a zone identifier corresponding to a zone Zin where the badge reader is located and a zone identifier corresponding to a zone Zout to which the badge reader gives access: transmitting by the server to the badge reader, a key Kin associated with the zone Zin, a key Kout associated with the zone Zout, and an IDlist table comprising a list of badge identifiers authorized to enter the zone Zout, wherein said transmitting is performed by a processor within the server;

upon reception by the server from the badge reader of an intrusion message indicative of refusal of granting a badge access to the zone Zout and comprising a current badge identifier ID of the badge, a zone identifier corresponding to Zin, and a zone identifier corresponding to Zout:

updating by the server the IDlist table by removing the current badge identifier ID from the IDlist table;

sending by the server the updated IDlist table to the badge reader; and decrementing by the server the number Pin of badges present in the zone Zin, and if after said decrementing Pin is equal to zero then sending to the badge reader a new key Kin associated with the zone Zin.

13. A server comprising a server processor adapted to execute instructions of a software program to perform the method of claim 11, said server processor being the processor within the server.

14. A computer readable storage medium comprising instructions for performing the method of claim 11 through execution of said instructions by the processor within the server, said computer readable storage medium being within the server.

15. A server comprising a server processor adapted to execute instructions of a software program to perform the method of claim 12, said server processor being the processor within the server.

16. A computer readable storage medium comprising instructions for performing the method of claim 12 through execution of said instructions by the processor within the server, said computer readable storage medium being within the server.

* * * * *